United States Patent [19]

Chrise et al.

[11] Patent Number: 5,053,189

[45] Date of Patent: Oct. 1, 1991

[54] SYSTEM PROVIDING IMPROVED GUIDANCE SUPPORT WITH RESTRICTED COOLANT FLOW FOR CONTROL RODS IN THE UPPER HEAD PLENUM OF A NUCLEAR REACTOR

[75] Inventors: James R. Chrise; James A. Rex, both of Trafford; David E. Boyle, Spring Church; Richard E. Schwirian, Pleasant Hills, all of Pa.

[73] Assignee: Westinghouse Electric Corp., Pittsburgh, Pa.

[21] Appl. No.: 422,261

[22] Filed: Oct. 16, 1989

[51] Int. Cl.⁵ .................................. G21C 1/01
[52] U.S. Cl. ..................................... 376/353
[58] Field of Search ................ 376/243, 327, 353

[56] References Cited

U.S. PATENT DOCUMENTS

| | | | |
|---|---|---|---|
| 4,707,331 | 11/1987 | Sherwood et al. | 376/353 |
| 4,738,023 | 4/1988 | Fabris | 376/353 |
| 4,842,815 | 6/1989 | Cauquelin et al. | 376/353 |
| 4,857,264 | 8/1989 | Veronesi et al. | 376/353 |

Primary Examiner—Stephen C. Bentley
Attorney, Agent, or Firm—M. G. Panian

[57] ABSTRACT

A new system is provided for control rod guidance support with wear mitigating features in a nuclear reactor pressure vessel.

The upper guide tube and the lower guide tube structures house the control rod when it is withdrawn from the fuel core.

The upper guide tube has a top enclosure plate with a drive rod opening therethrough sized to provide a predetermined clearance space between the drive rod and the top enclosure plate and to direct coolant flow between the upper and outlet plenums and through the guide tube assembly to allow transmittal of upper plenum bypass cooling flow to the outlet plenum.

Structure is provided for restricting coolant flow through the top plate clearance space to reduce control rod wear. A coupler secures the drive and control rods in end-to-end relation within the guide tube assembly. The coupler is located just below the top guide tube enclosure plate with the control rod fully withdrawn. The coolant restricting structure includes a flow restricting sleeve secured to the coupler and extending upwardly over the drive rod through the top guide tube enclosure plate. A flow restrictor is located above and secured to the top guide tube enclosure plate, and it has an upper portion disposed about and spaced from the flow restricting sleeve to provide a flow gap having a flow area substantially equal to the clearance space. The flow restrictor is otherwise structured to provide at least one contraction-expansion loss above the top guide tube plate for guide tube coolant flow through the flow gap.

20 Claims, 15 Drawing Sheets

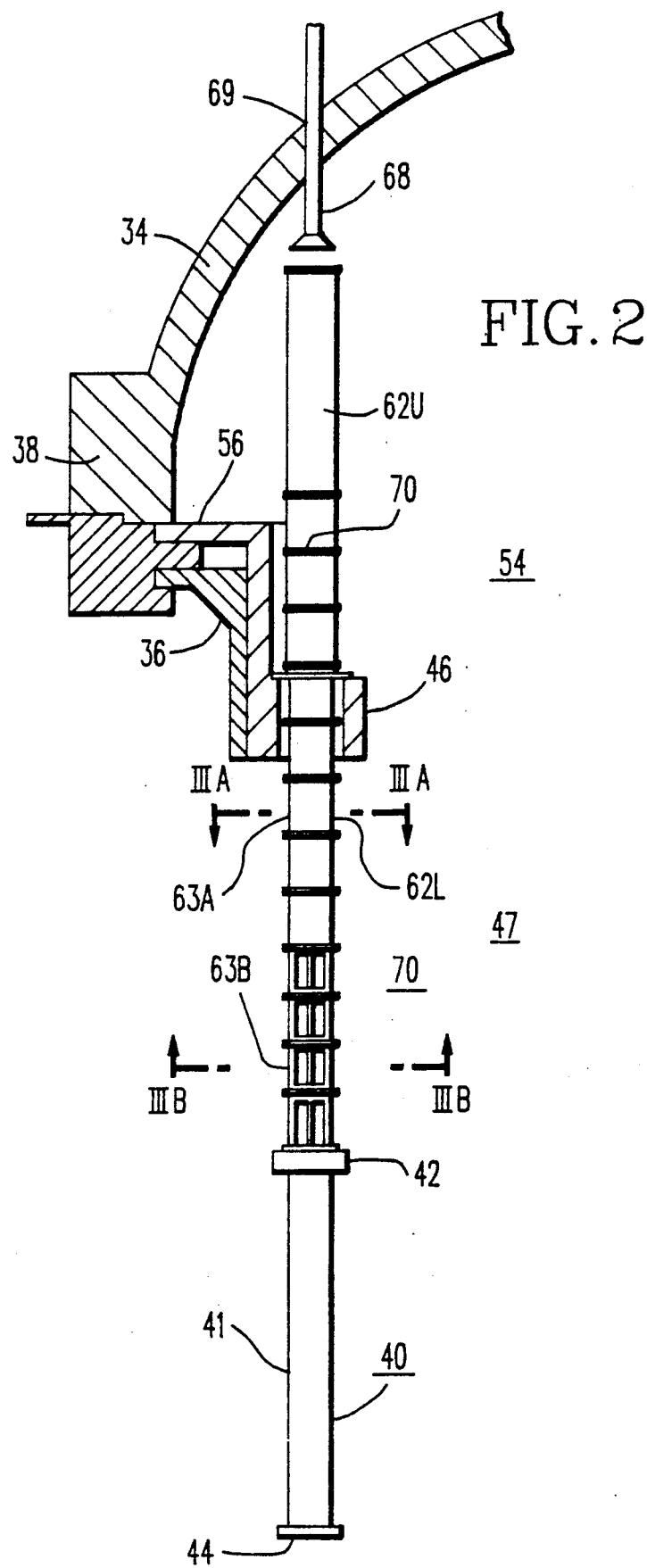

5,053,189

SYSTEM PROVIDING IMPROVED GUIDANCE SUPPORT WITH RESTRICTED COOLANT FLOW FOR CONTROL RODS IN THE UPPER HEAD PLENUM OF A NUCLEAR REACTOR

BACKGROUND OF THE INVENTION

The present invention relates to nuclear reactors and more particularly to support and guidance structure for control rods in such reactors.

In a typical pressurized water reactor for an electric power plant, over fifty elongated control rod assemblies are located in plenum space above the reactor core and disposed for vertical movement into or out of the core to control or shut down the nuclear reaction. Normally, only four or five control rods are needed for power generation control and the remaining rods remain fully withdrawn during reactor operation for use in shutting the reactor down when required or desired.

A control rod drive is provided for each control rod assembly above the reactor pressure vessel dome. Typically, a drive rod extends downwardly from each drive through a vessel dome penetration to a point within the reactor vessel where it is coupled to the control rod itself. In turn, the control rod is formed by a cluster of rodlets suspended from a spider assembly that is coupled to the drive rod.

Each control rod assembly is aligned with an individual fuel assembly within the reactor core. The rodlets in each control rod assembly are aligned for entry into respective vertical thimbles interspersed with vertical fuel rods in the fuel assembly. Fuel assemblies at preselected core locations are designated for control rod operation and the number and location of control rod assemblies are correspondingly determined.

A vertical guide tube structure houses each control rod including its rodlet cluster in space above the reactor core to provide guided support for the control rod against horizontal forces when it is fixed in its position or as it moves vertically toward or away from the reactor core.

Generally, the space above the upper core support plate within the vessel is divided by an upper support plate into an upper head plenum above the plate and an outlet plenum below the plate. Hot upward coolant flow from the reactor core is collected in the outlet plenum and directed through outlet nozzles to two or more steam generators. The number of outlet nozzles corresponds to the number of coolant loops provided for the reactor plant.

Cold coolant flow from the steam generators is returned to the reactor vessel through inlet nozzles to an annular downcomer space inside the pressure vessel wall where it is directed downwardly to the bottom of the core for another upward heat collecting pass through the core.

Spray nozzles are spaced peripherally about the vessel/dome flange to direct some of the return flow as a core bypass flow into the upper head plenum where it provides dome and control rod drive cooling. It returns to the outlet plenum through the control rod guide tube structures. Pressure differential between the downcomer and the upper head plenum determines the amount of coolant flow through the upper head spray nozzles.

In one plant type referred to as a "cold temperature" plant, the upper plenum coolant reservoir is held at the cooler inlet temperature by providing enough bypass flow into the upper plenum to disallow mixing of upward flowing core outlet flow into the upper plenum. The cold upper plenum water provides adequate core cooling capability in case of a possible loss of coolant accident in this plant type.

In a "hot temperature" plant, some coolant flows upwardly through some of the radially inwardly located control rod guide tube structures from the outlet plenum thereby providing a portion of the total inlet flow to the upper head plenum and a somewhat warmer upper plenum reservoir. Typically, a cold plant has an upper plenum temperature of 550 to 560° F. whereas a hot plant has an upper plenum temperature of 590° to 620° F.

Each control rod guide tube structure normally includes an upper solid tube that is secured to the upper support plate and extends upwardly within the upper plenum. Further, a lower guide tube is secured to the upper support plate in alignment with the upper guide tube and extends downwardly within the outlet plenum. Horizontal cards are disposed within the guide tubes at spaced locations to provide control rodlet guidance support along the guide tube height. The lower guide tube usually has small wall openings along its height at the card locations through which coolant may flow from the guide tube into the outlet plenum, or vice versa in the case of some guide tubes in a hot plant.

While coolant flow is needed within the guide tubes for transmitting flow into or out of the upper plenum, it also contributes to control rod wear problems. Rodlet wear typically occurs in the vicinity of the horizontal rodlet support cards as a result of flow induced rodlet vibrations. The rodlet wear is usually significantly greater in the upper plenum region, and it varies in accordance with the radial position of the control rod assembly. Rodlet wear is reduced in hot plants as compared to cold plants, but it is a problem in both types of plants with differences occurring mainly in the time it takes for a given level of rodlet wear to occur.

The present invention is directed to controlling the flow around the control rods in the guide tubes to provide improved control rod operation with reduced rodlet wear.

SUMMARY OF THE INVENTION

A new system is provided for control rod guidance support in a nuclear reactor pressure vessel having a fuel core with an outlet plenum for core heated coolant located thereabove and with an upper head plenum located above the outlet plenum and receiving a portion of return core coolant flow. A plurality of externally driven control rod assemblies each having a drive rod coupled to a depending control rod and extending vertically through the upper plenum and outlet plenum spaces are provided for control rod movement into and out of the core to control the nuclear reaction.

A generally solid upper horizontal support plate is secured to the vessel above the fuel core between the upper head plenum and the outlet plenum. A control rod guide tube assembly is provided for each control rod assembly, and it includes an upper guide tube located in the upper plenum above the upper support plate and lower guide tube means located in the outlet plenum and aligned with the upper guide tube through an opening in the upper support plate and further aligned with a fuel assembly located in the core therebelow.

The upper guide tube and the lower guide tube means house the control rod when it is withdrawn from the fuel core. A plurality of horizontal support cards are secured within the guide tube structure at vertically spaced locations, and they are provided with openings therethrough to provide guided support of the control rod when it is positioned and as it moves along its vertical path of motion.

The upper guide tube has a top enclosure plate with a drive rod opening therethrough sized to provide a predetermined clearance space between the drive rod and the top enclosure plate and to direct coolant flow between the upper and outlet plenums.

Structure is provided for restricting coolant flow through the top plate clearance space to reduce control rod wear. Coupling means secures the drive and control rods in end-to-end relation within the guide tube assembly. The coupling means is located just below the top guide tube enclosure plate with the control rod fully withdrawn. The coolant restricting structure includes at least a flow restrictor located above and secured to the top guide tube enclosure plate, and it has an upper portion disposed about and spaced from the drive rod to provide a flow gap having a flow area substantially equal to the clearance space and is otherwise structured to provide at least one contraction-expansion loss above the top guide tube plate for guide tube coolant flow through the flow gap.

A total bypass flow area is provided between the upper and outlet plenums to take up at least some of the restricted flow from the upper control rod guide tubes.

BRIEF DESCRIPTION OF THE DRAWINGS

FIG. 2 shows an enlarged view of a guide tube assembly arranged in accordance with the invention to provide improved control rod operation through reduced rodlet wear;

FIG. 11c is a variation of the embodiment shown in FIG. 11a; and

DESCRIPTION OF THE PREFERRED EMBODIMENT

The Nuclear Reactor

Figure 1:
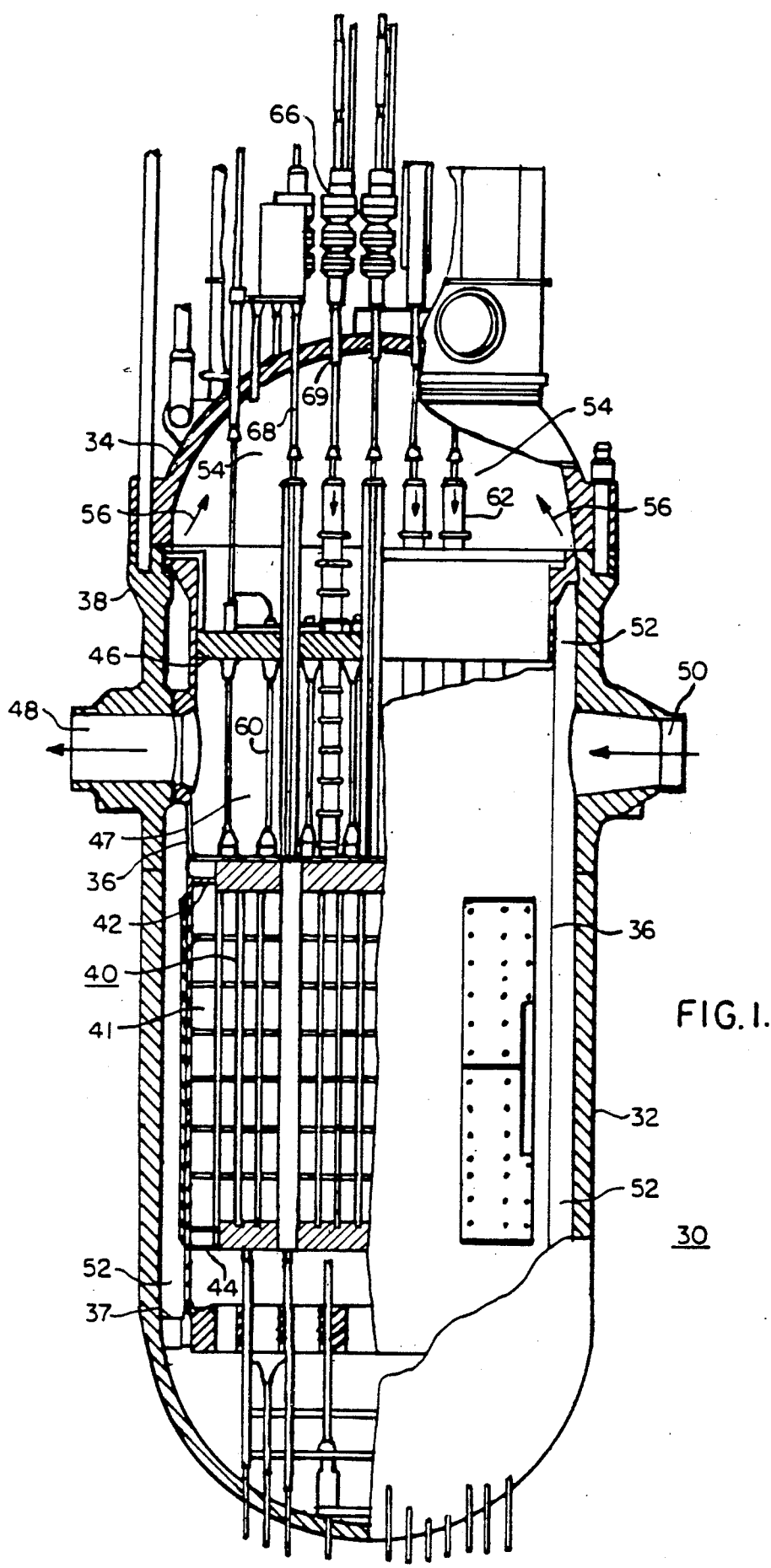
FIG. 1 shows a cutaway elevation view of a nuclear reactor pressure vessel within which there are disposed a fuel core and guide tube assemblies therefor.

More particularly, there is shown in FIG. 1 a pressure vessel body 32 for a pressurized water nuclear reactor 30. A dome 34 is provided for the vessel 32 and an outer core barrel 36 is secured to and extends downwardly from a flange 38 where the dome and vessel body are secured together. The bottom of the core barrel 36 is secured to the vessel body 32 as indicated by the reference character 37.

A fuel core 40 is supported within the core barrel 36 by a horizontal upper core support plate 42 and a horizontal lower core support plate 44. The core 40 comprises an array of vertically elongated fuel assemblies 41, in this case a total of 157 to 193 fuel assemblies for 3 and 4 loop plants.

Each fuel assembly comprises an array (not detailed) of vertically elongated fuel rods, in this case a 17×17 rod array with predetermined rod locations having control rod thimbles (not shown) instead of fuel rods. Horizontal grid members (not shown) provide support against fuel rod bending at various points along the height of each fuel assembly.

As subsequently considered more fully, only about 30% of the assemblies are designated for control rod operation. Thus, a total of forty-eight to sixty-one fuel assemblies are used in this case for control rod insertion. The remaining fuel assemblies are inactive from a control rod standpoint, and the control rod thimbles for those assemblies may be end plugged.

A horizontal upper support plate 46 is located within the core barrel 36 at an elevation just below the flange 38. The space 47 formed between it and the upper core support plate 42 is called the outlet plenum since the reactor coolant heated in an upward pass through the fuel core 40 is collected in this space for outflow through two or more outlet nozzles 48 to the steam generator(s) (not shown).

Return flow from the steam generators passes through two or more inlet nozzles 50 to a downcomer space 52 between the pressure vessel body 32 and the core barrel 36. The return flow mainly moves downwardly through the downcomer space to the bottom of the fuel core 40 where it begins another upward pass through the fuel core 40 in the spaces between the fuel rods to absorb heat generated by the nuclear reaction.

As previously noted, some of the return flow is bypassed from the core 40 for flow from the top of the downcomer 52 through spray nozzles into the space 54, called the upper plenum, above the upper support plate 46. The bypass flow to the upper plenum passes through nozzles located in the flange of the core barrel 36 as indicated by arrows 56.

Reactor control is provided by a plurality of control rod assemblies 60, in this instance forty-eight to sixty-one control rod assemblies as previously indicated. The control rod assemblies 60 are provided with control rod guidance support by respective guide tube assemblies 62 extending vertically through the upper head plenum 54 and the outlet plenum 47 as shown.

As observed in FIG. 11, the upper support plate 46 is provided with a number of openings 64 corresponding in number and aligned with the downwardly located fuel assemblies. Respective cover plates 65 close the openings 64 located above fuel assemblies for which no control rods are provided. The control rod guide tube assemblies 62 extend through those openings 64 aligned with fuel assemblies for which control rods are provided.

Generally, the guide tube assemblies 62 are bolted or otherwise secured to the upper support plate 46 such that the upper support plate 46 conventionally forms a barrier against flow from the upper head plenum 54 to the outlet plenum 47. Coolant flow does pass from the upper plenum 54 through the guide tube assemblies to the outlet plenum 47. (The purpose of the flow is to maintain a cold reservoir of water in the upper head to provide better loss of coolant safety margins for the fuel in case of an accident).

Respective control rod drives mechanisms 66 are located above the vessel dome 34 in alignment with the respective control rods. Each mechanism operates a downwardly extending drive rod 68 that extends through a dome penetration 69 and is coupled to each control rod assembly to implement control over control rod position by the drive mechanisms 66. Some coolant does pass from the upper plenum 54 through the control rod drive mechanisms 66 and back to the plenum 54 to prevent overheating of the control rod mechanisms 66.

Normally, only four or five preselected control rod assemblies need to be inserted into the fuel core 40 to regulate the level of power generated by the nuclear reaction. The remaining fifty or so control rod assemblies are normally fully withdrawn from the fuel core 40 during reactor operation, that is the control rod assembly itself is positioned so that its top is near the top of the guide tube assembly 62 and its bottom is just inserted into the top of the thimble tubes of the fuel assemblies 41. To shut the reactor down, all control rods are fully inserted into the fuel assemblies 41.

Control Rod Guide Tube Assemblies—More Detail

Figure 3A:
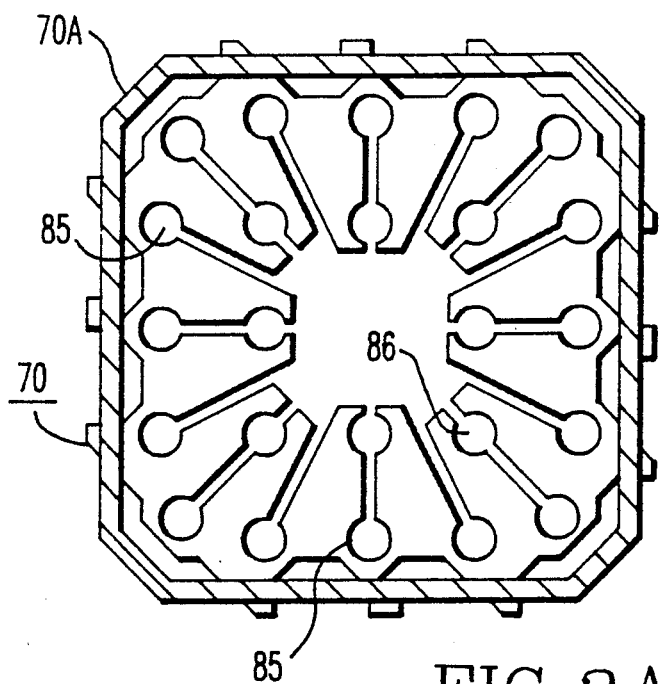
FIG. 3a shows a top plan view of a support card which is secured at spaced locations within the control rod guide tube to provide guidance support for the control rodlets.
Figure 3B:
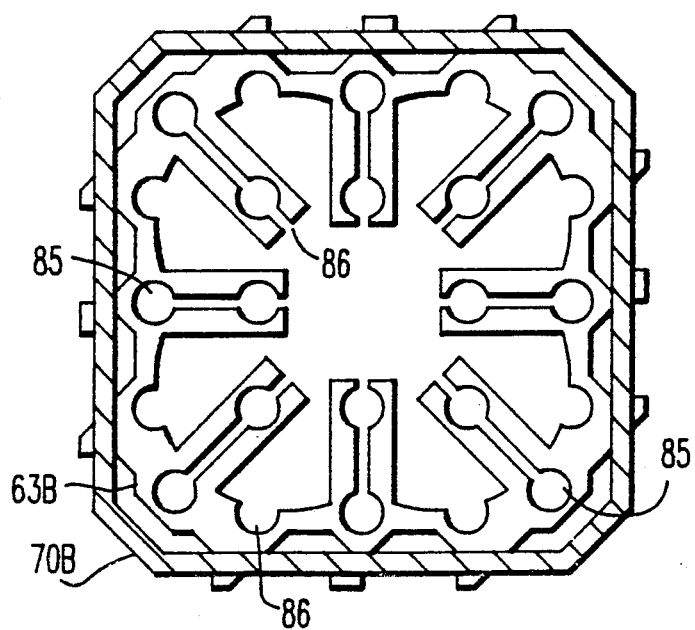
FIG. 3b shows a correction of the guide tube continuous support.

More detail is shown for the control rod assemblies 60 and guide tube assemblies 62 in FIGS. 2 and 3. In FIG. 2, the guide tube assembly 62 is shown aligned with a fuel assembly 41. The guide tube assembly 62 includes an upper guide tube 62U bolted to the top of the upper support plate 46 and an aligned lower guide tube subassembly 62L bolted to the bottom of the upper support plate 46. In turn the lower guide tube subassembly includes an intermediate guide tube 63A and a lower guide tube continuous section 63B that terminates at the upper core support plate 42.

Guide tube support cards 70 (70A of FIG. 3A or 70B of FIG. 3B) are secured within the guide tube assemblies 62 at spaced locations along the guide tube height to provide guided support for the individual control rodlets of each control rod assembly 60. The spacing between the guide tube support cards may for example be one foot.

Operating experience with nuclear power plants indicates that control rodlet wear is greatest at rod locations near the guide tube support cards 70 principally as a result of flow induced rod vibrations. Further, significantly greater rodlet wear occurs for the withdrawn control rods in the upper guide tubes 62U. Coolant flow through the guide tubes is a major contributor to rodlet vibrations that are the main cause of rodlet wear near the guide tube support cards 70.

Figure 5:
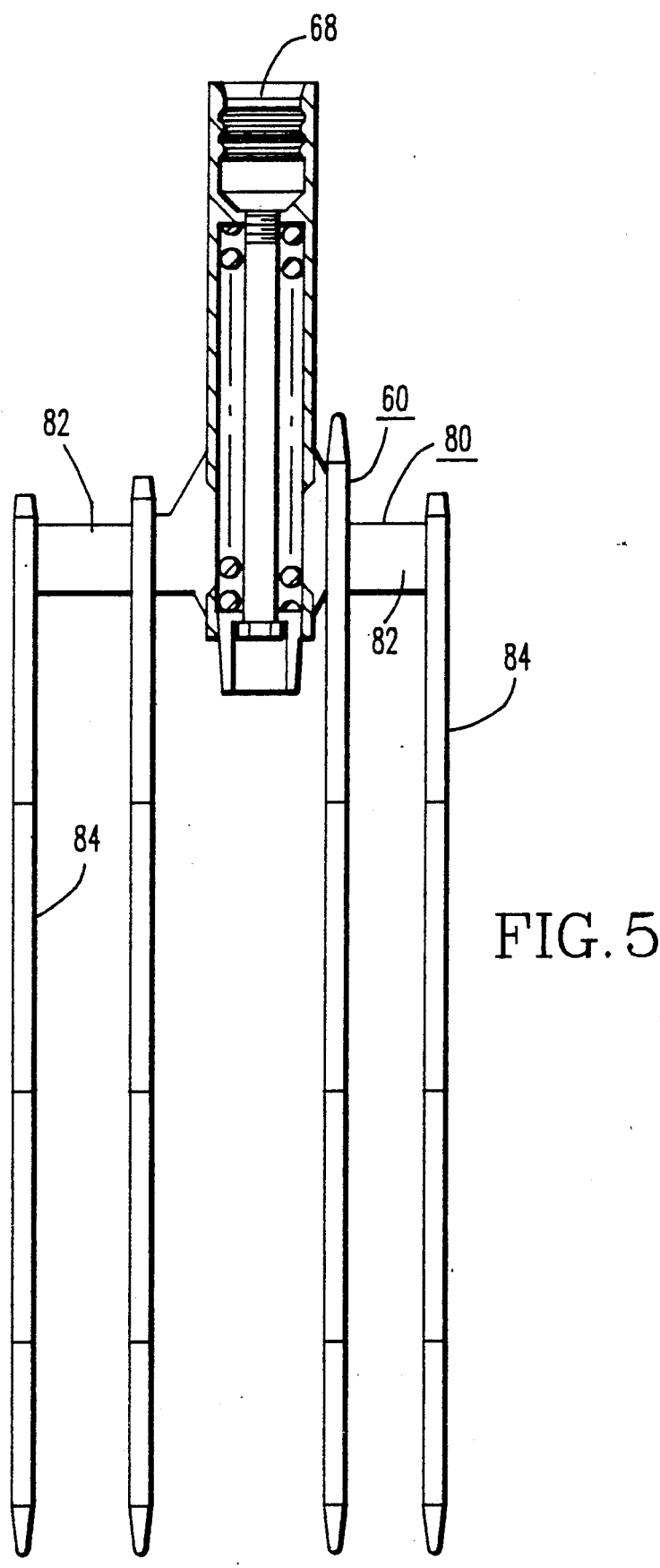
FIG. 5 is an enlarged sectional elevation view of the control rod taken along the reference plane V—V of FIG. 4.

As shown in FIGS. 3 and 5, each control rod assembly 60 includes a top spider plate 80 that is coupled to the drive rod at 68. The spider 80 includes a plurality of radially extending vanes 82, each of which supports one or more control rodlets 84 that extend downwardly therefrom to the bottom of the control rod assembly. Each rodlet 84 may for example comprise a hafnium core which operates as a neutron absorber and an outer stainless steel cladding.

The individual rodlets 84 extend through aligned openings or slots 85 or 86 (FIGS. 3a, 3b) in the guide tube support cards 70 or lower guide tube continuous section 63B. The guiding support relationship thus provided by the guide tube support cards 70 for the rodlets 84 accordingly is also a major source of rodlet wear under flow induced rodlet vibration.

Figure 4:
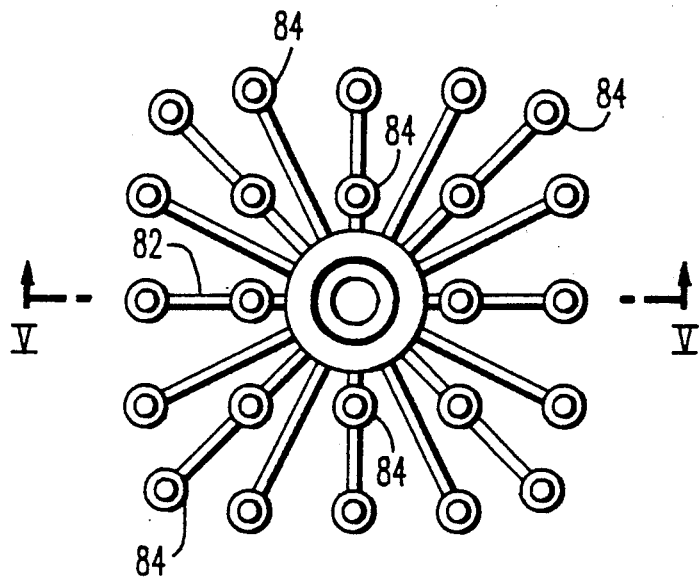
FIG. 4 shows a top plan view of a control rod assembly employed in the reactor of FIG. 1 for fuel rod assemblies having a 17×17 rod array.
Figure 6:
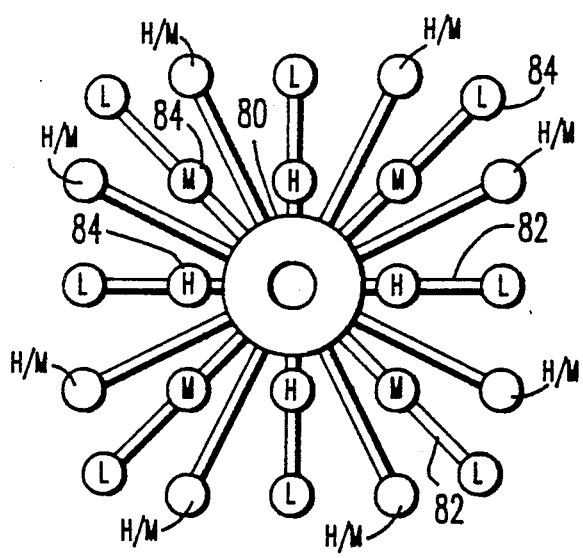
FIG. 6 is a schematic representation of a top view of the control rod indicating the degree of wear typically experienced by the various rodlets during reactor operation.

As shown in the top plan view of FIG. 4, each control rod in this case includes a total of twenty-four rodlets 84. In FIG. 6, a coding scheme is used to show the relative wear that typically occurs for the various rodlets 84. Thus, high wear H occurs for the four inside face rodlets; high/medium wear H/M occurs for the eight outer single vane rodlets; medium wear M occurs for the four inside corner rodlets; and low wear L occurs for the remaining eight outer rodlets.

System Providing Guidance Support With Restricted Coolant Flow For Control Rods

Generally, reduced control rod wear is achieved in accordance with the invention by the application of structure at the upper end of the upper control rod guide tube that reduces the flow of coolant from the upper plenum through the guide tube particularly when the control rod is located in its withdrawn position. With the guide tube flow thus limited, bypass flow paths are provided through the upper support plate to maintain desired flow from the upper plenum to the outlet plenum.

Figure 7:
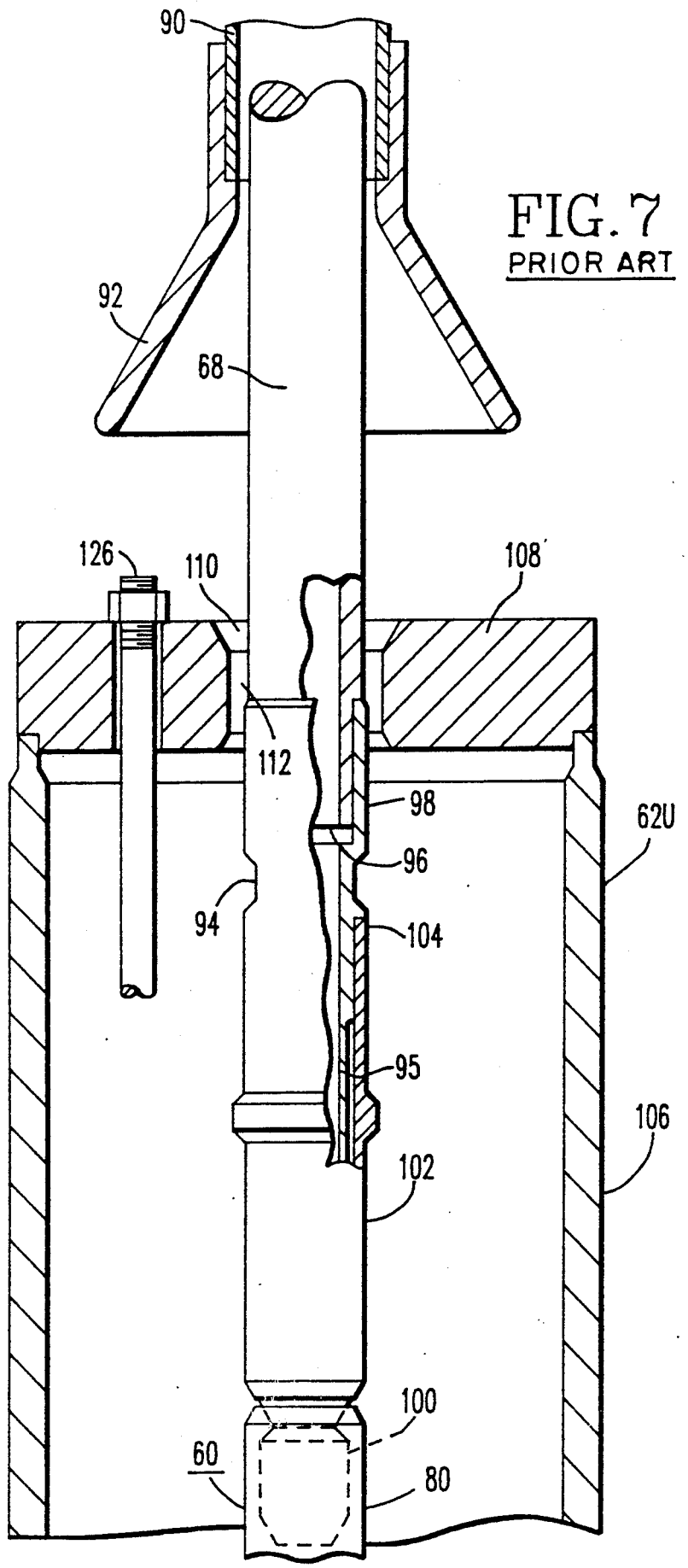
FIG. 7 shows, with portions broken away, a typical prior art coupling between the drive rod and the control rod assembly.

The typical prior art structure for the upper guide tube and the control rod assembly in the vicinity of the upper end of the upper guide tube is shown in FIG. 7 with the control rod in its fully withdrawn position. Thus, the drive rod 68 extends downwardly from above and it is located within a thermal sleeve 90 having a bottom funnel 92 that terminates with some spacing above the top of the upper control rod guide tube 62U.

The control rod 60 is located within the upper control rod guide tube 62U and extends further downwardly into the top of the thimble tubes of the fuel assemblies 41 (FIGURE 1). A coupling 94 is provided to support the control rod 60 from the drive rod in end-to-end relationship. Thus, the coupling 94 mechanically links the end portion 96 of the drive rod 68 to the control rod spider 80.

The rod coupler 94 includes a threaded portion 98 that securely attaches to the drive rod bottom end end portion 96 within the upper guide tube 62U. It also includes a bottom end gripper 100 that securely engages the control rod spider 80. A protective sleeve 102 covers the coupler flexures 95 from the bottom portion 100 to a point just short of the gripper portion 98 as indicated by the reference character 104.

In the fully withdrawn control rod position, the drive rod thus extends downwardly into the upper control rod guide tube 62U where it is coupled to the control rod spider and the control rod extends further downwardly therefrom. When the control rod drive mechanism is operated to lower the control rod into the fuel core, the drive rod/control rod subassembly is lowered through the guide tube structure until the desired control rod position is reached.

The upper guide tube 62U includes a cylindrical side wall 106 and a top enclosure plate 108 that extends over the open upper end of the tube wall 104. A hole 110 is located in the top plate 108 for the drive and control rod assembly. The hole 110 is large enough to provide a clearance space 112 between the rod assembly and the body of the top guide tube plate 108 both to provide for inlet coolant flow to the upper guide tube 62U from the upper plenum and to permit unobstructed upward and downward movement of the drive and control rod assembly.

Figure 8:
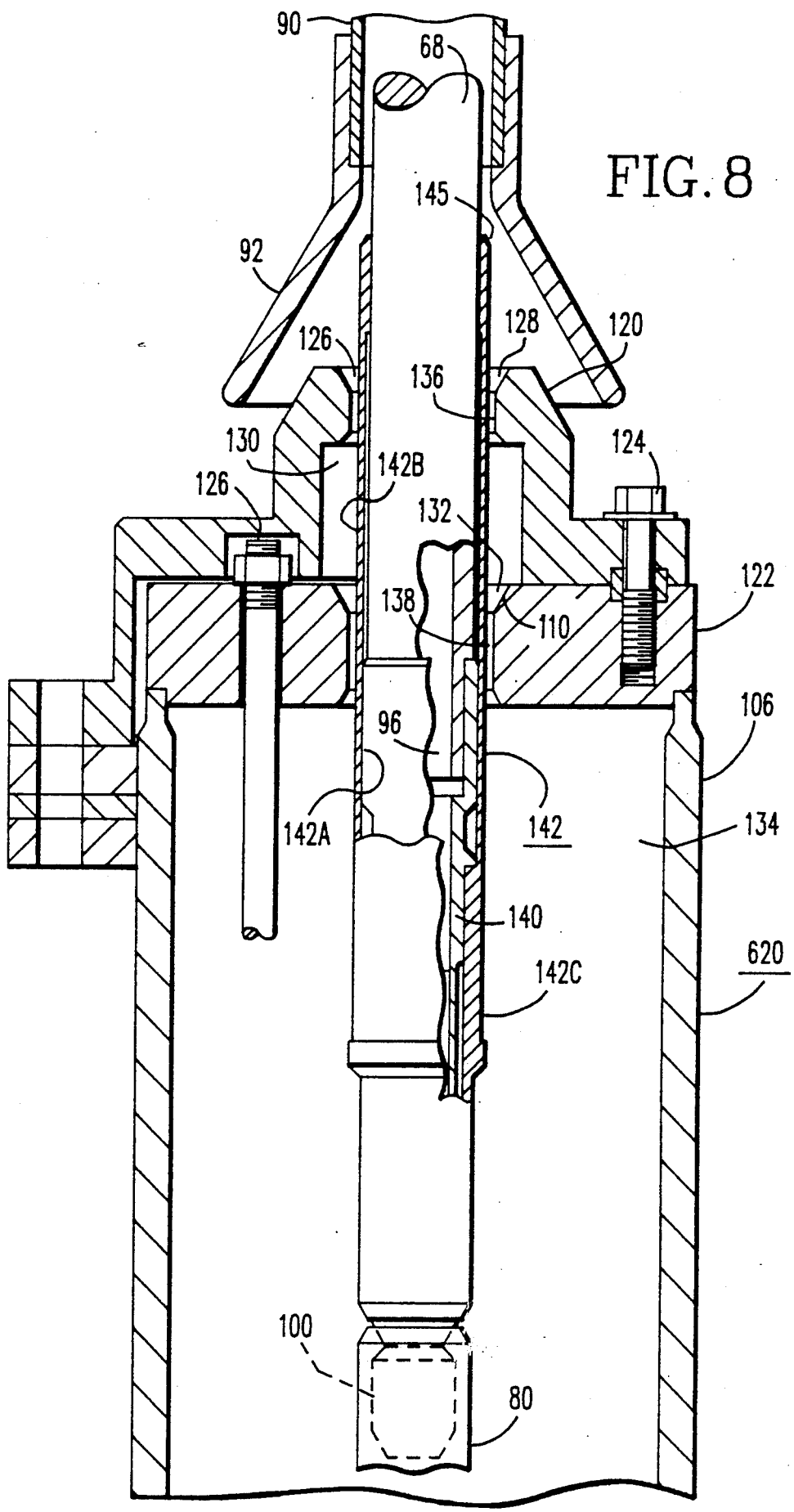
FIG. 8 shows an elevation view of the preferred embodiment of a drive rod assembly especially adaptable to retrofit applications and structured in the vicinity of the upper guide tube enclosure plate to provide improved control rod operation in accordance with the invention.

There is shown in FIG. 8 improved structure that restricts coolant flow into the upper inlet end of the upper control guide tube in accordance with a preferred embodiment of the invention. The FIG. 8 embodiment is preferred since it achieves desired results yet can be applied economically as a retrofit to provide an improvement update for preexisting field installations. Where the prior art and the improvement structure involve like structural elements, corresponding reference characters are employed.

To restrict inlet coolant flow, a flow restrictor 120 is bolted or otherwise secured to top plate 122 as indicated by the reference character 124. Apart from the provision for flow restrictor securance, the top plate 122 is otherwise like the prior top plate 108. Bolt 126 is employed to prevent excessive twisting of the spider during scram.

The flow restrictor 120 is formed with a central opening 126 preferably having a diameter equal to the hole 110 in the top guide tube plate 122. A flow contraction at 128 and a flow expansion into enlarged space 130 within the flow restrictor 120 provides flow resistance in addition to that provided by a top plate flow contraction at 132 and expansion into enlarged space 134 within the upper guide tube 62U.

Additional flow resistance is provided by a reduction in the flow cross-section of the clearance space 136 between the drive rod 68 and the flow restrictor 120 and the clearance space 138 between the drive rod 68 and the top plate 122. Preferably, the reduced flow area is achieved by providing drive/control rod coupling 140 with a protective sleeve 142C similar to the prior art protective sleeve 102 with an extended flow restrictor sleeve 142 that is positioned over the existing coupling 140 and drive rod 68. This modified protective sleeve with flow restrictor sleeve extension 142 is attached by threading to the coupler 140 in the same manner as the prior art protective sleeve. The flow restrictor sleeve 142 extends upwardly over the drive rod 68 through the opening 110 in the guide tube top plate 122 and the opening 126 in the flow restrictor 120. The upper end of the flow restrictor sleeve 142 can be welded or pinned to the drive rod 68.

Additional flow restriction can be achieved by providing a flow restrictor with additional contraction/expansion structure within the control rod guide tube 62U. However, it is preferable that added flow restriction be achieved by flow area reduction as already described since additional flow restrictor structure within the guide tube requires that the guide tube top plate be cut away to permit insertion of the flow restrictor into the guide tube. In retrofit applications, such cutting and any drilling has to be performed under water. In any case, achievable increases in the loss coefficient would not likely be enough to produce desired flow reduction through the control rod guide tube 62U, and flow area reduction is also needed as already described.

Overall, coolant flow is limited by increased hydraulic resistance K/Asquared. That is, the loss coefficient K is increased by additional contraction/expansion and the flow area A is reduced by the sleeve 142.

The drive rod clearance spaces 136 and 138 with the control rod in its illustrated fully withdrawn position are thus the respective gaps between the sleeve 142 and the flow restrictor 120 and the top guide tube plate 122. With this arrangement, the original drive rod clearance space 112 shown in FIG. 7 is available for drive rod movement when the control rod is lowered from its fully withdrawn position and the top end 145 of the sleeve 142 has dropped below the top guide tube plate 122.

When the control rod is lowered and the original rod clearance is applicable, the flow resistance is significantly reduced since the guide tube inlet flow area is greater. However, as previously noted the greatest control rod wear occurs with the control rod fully withdrawn for reasons including the fact that the great majority of the control rods are fully withdrawn for most of the reactor operating time.

Upper Support Plate Flow Redistribution

In implementing the invention, it is preferable that provision additionally be made for redistributing the coolant flow restricted from entry to the control rod guide tubes 62U, i.e. a bypass flow from the upper plenum 54 to the outlet plenum 47 is preferably provided to make up the flow reduction through the control rod guide tubes 62U. The unused control rod guide tube openings 64 in the upper support plate 46 are preferably used for this purpose, especially in retrofit applications of the invention.

Thus, the cover plates 65 are removed from selected control rod guide tube openings 64 and in their places respective orifice plates 150 (FIGURES 11a and 11b) are secured. The total flow area through openings 152 in the orifice plates 150 provides the desired total bypass flow from the upper plenum 54 to the outlet plenum 47. The radial pressure profile across the outlet plenum is employed in each plant in determining the location of the orifice plates and the size of the orifice openings so as to provide a total inter-plenum flow equivalent to the total flow prior to a guide tube flow restriction retrofit.

Figure 11C:
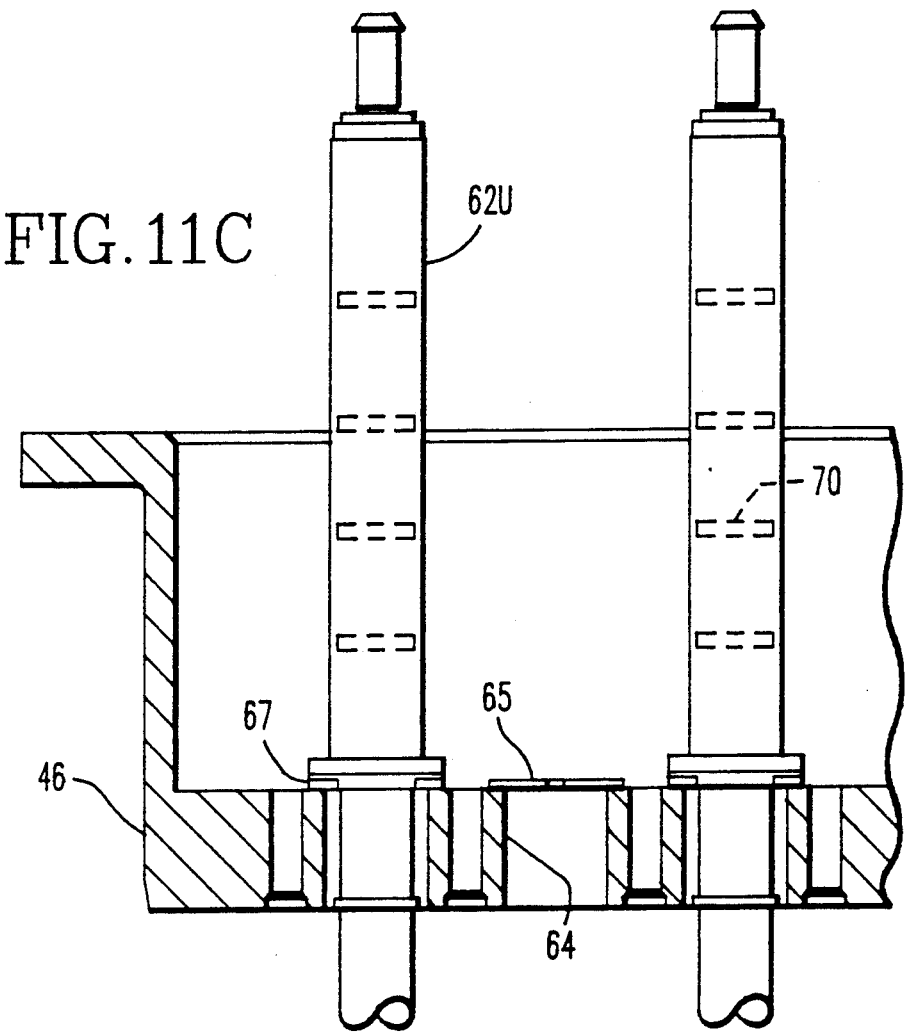
Figure 11A:
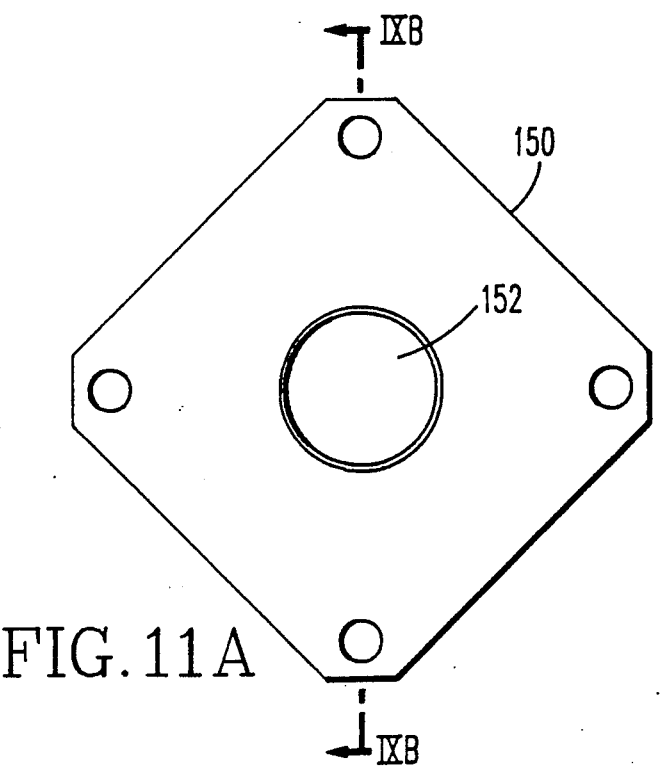
FIGURE 11a shows a top plan view of an orifice plate employed at predetermined array locations on the upper support plate to provide upper guide tube bypass flow to the downwardly located outlet plenum.
Figure 11B:
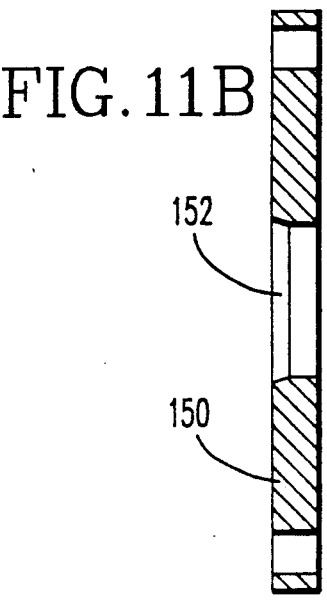
FIGURE 11b is a cutaway elevation view showing the placement of cover or orifice plates on the upper support plate.

In other applications of the invention, special openings may be provided in the upper support plate 46, or flow openings 67 may be provided in lower flange structure or the like provided at the bottom of the upper control rod guide tube 62U (see FIGURE 11c).

Other Embodiments Of The Invention

Selected additional embodiments of the invention in FIGS. 9 and 12–16.

Figure 9:
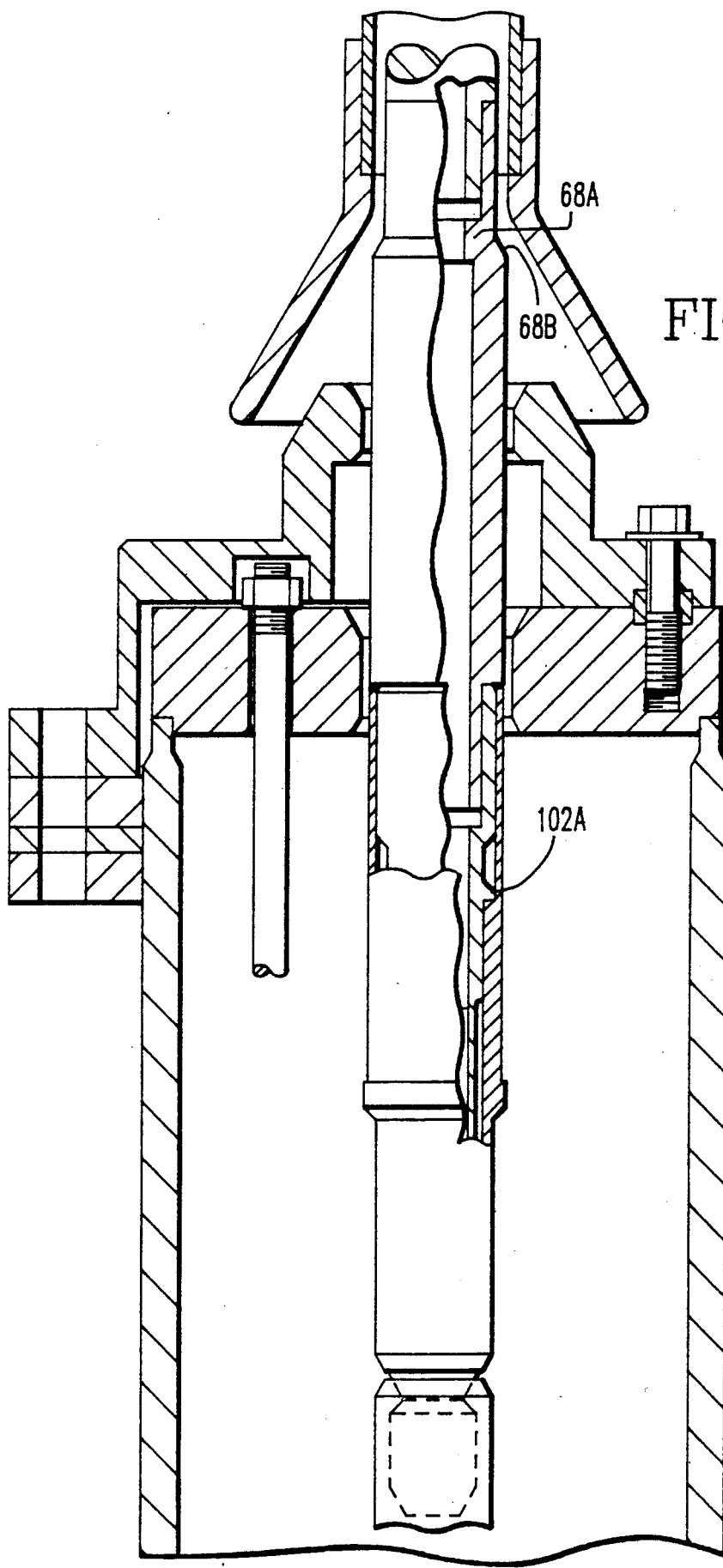
FIG. 9 shows a modified drive rod and protective sleeve that may be used in accordance with the invention for new power plant designs.
Figure 10:
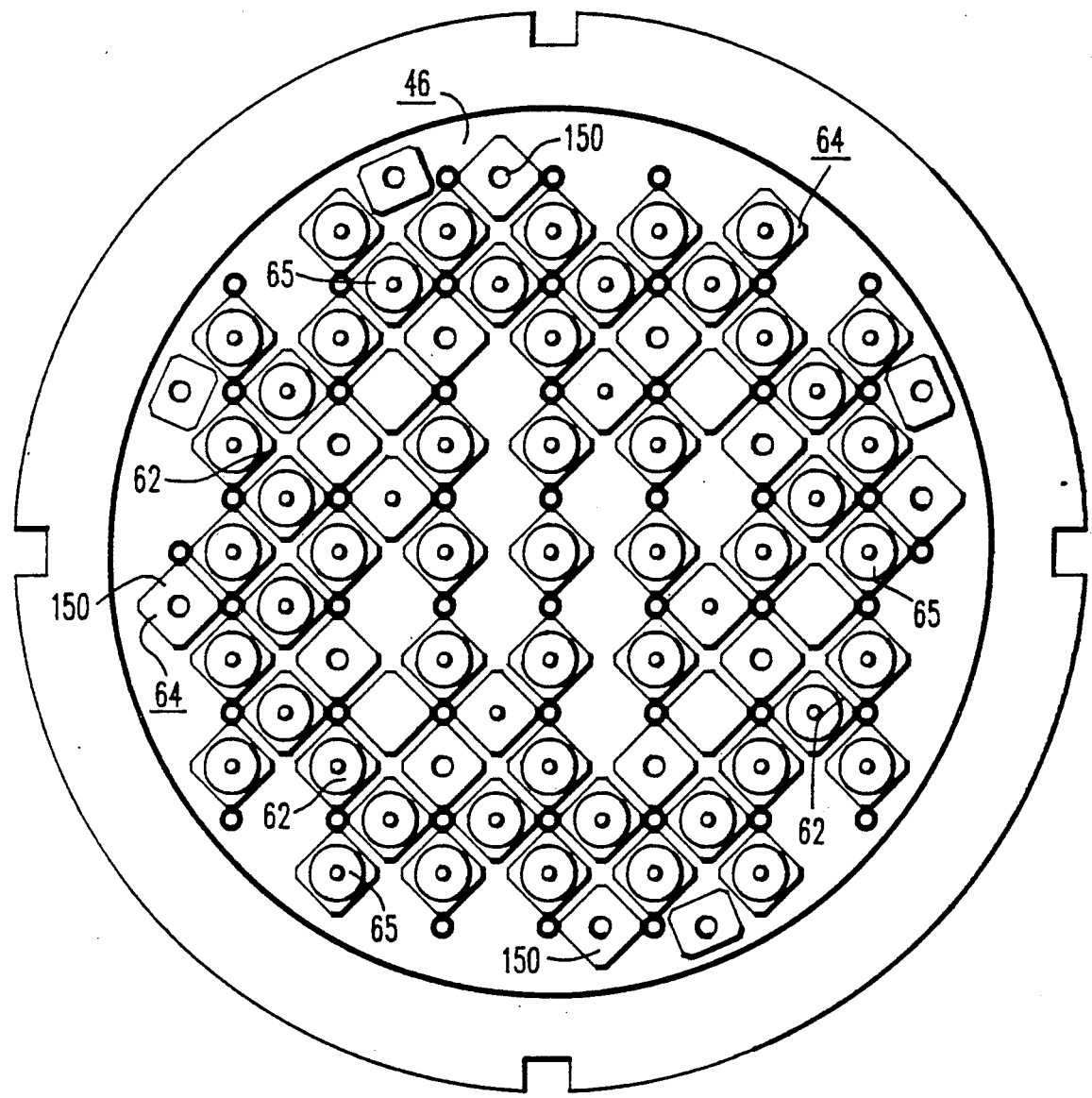
FIG. 10 shows a top plan view of an upper support plate designed for a cold upper head plenum temperature plant and structured in accordance with the invention to operate with the control rod assembly structure in providing improved control rod operation in accordance with the invention.

As shown in FIG. 9, flow restriction can be produced instead by a drive rod 68A having an end portion 68B with an enlarged diameter thereby reducing the coolant flow area within the flow restrictor and upper guide tube plate opening. In this case, a protective sleeve 102A like the prior art sleeve 102 is all that is required for the drive rod/control rod coupling. The FIG. 9 embodiment would be most applicable to new nuclear power plants.

In a variation (not shown) of the FIG. 8 embodiment, a flow restrictor sleeve dropped over the drive rod 68 until its lower end portion covers the upper part of the rod coupling and abuts the protective sleeve. The sleeve lower portion is then crimped against wrench flats on the coupling (see FIG. 12 at 68D).

A modified flow restrictor 160 (FIG. 13) can be employed for 4 loop nuclear plants with guide tubes which characteristically have more space between top plate 122A of the upper control rod guide tube 62U and the thermal sleeve guide 92. In this case, the flow restrictor 160 has structure 160A that extends into the enlarged space and helps prevent drive rod vibrations otherwise caused by upper plenum cross-flow. The structure 160A further provides three cascaded contraction/expansion losses 161A, 161B, and 161C.

If desired, the flow restrictor 160 may be further structured to include a lower extension 162 having structure that provides three additional cascaded contraction/expansion losses 163A, 163B, and 163C. However, the lower extension requires that the top upper guide tube plate be cut away as previously described.

Figure 12:
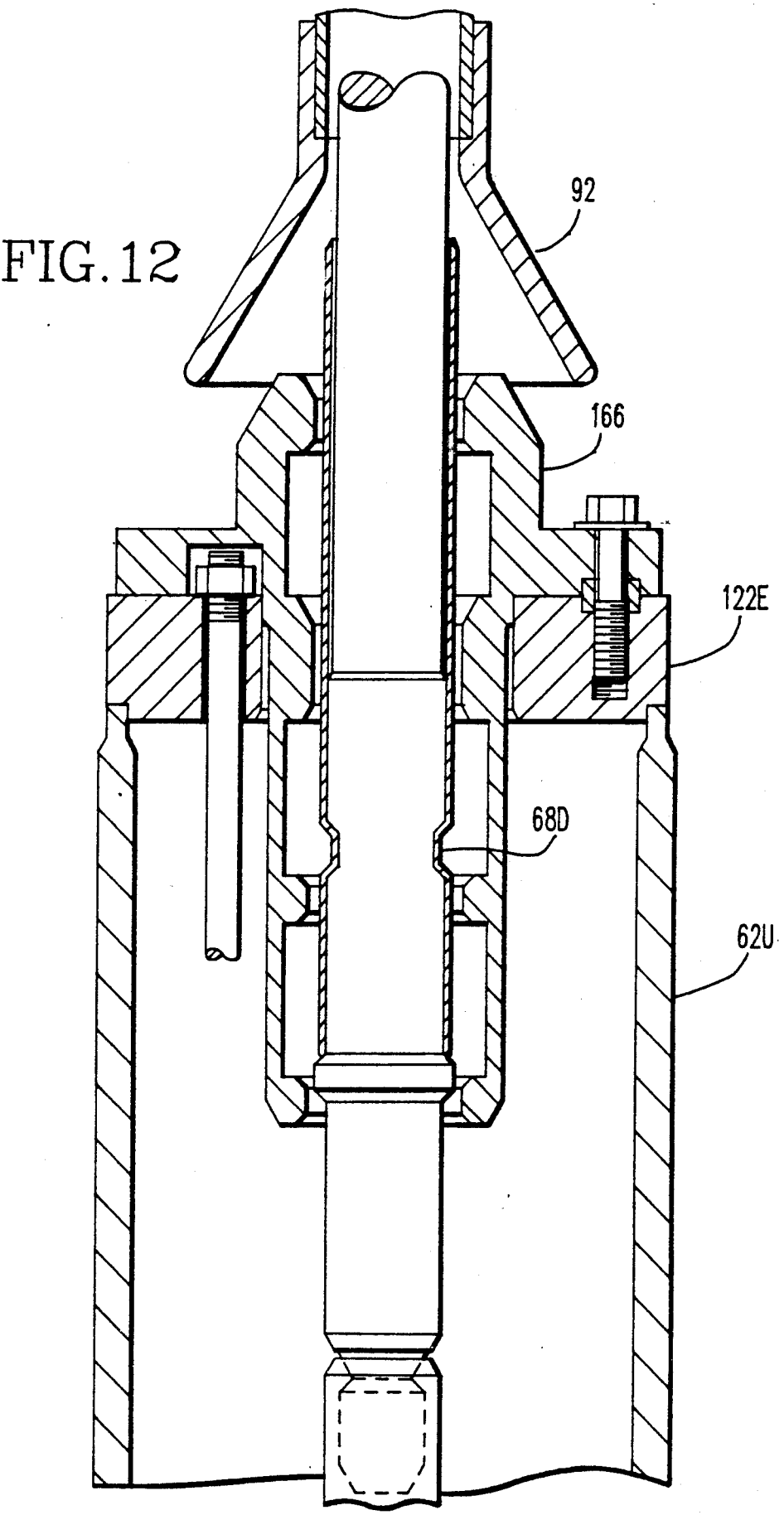
FIGS. 12-16 show additional embodiments of the invention.
Figure 13:
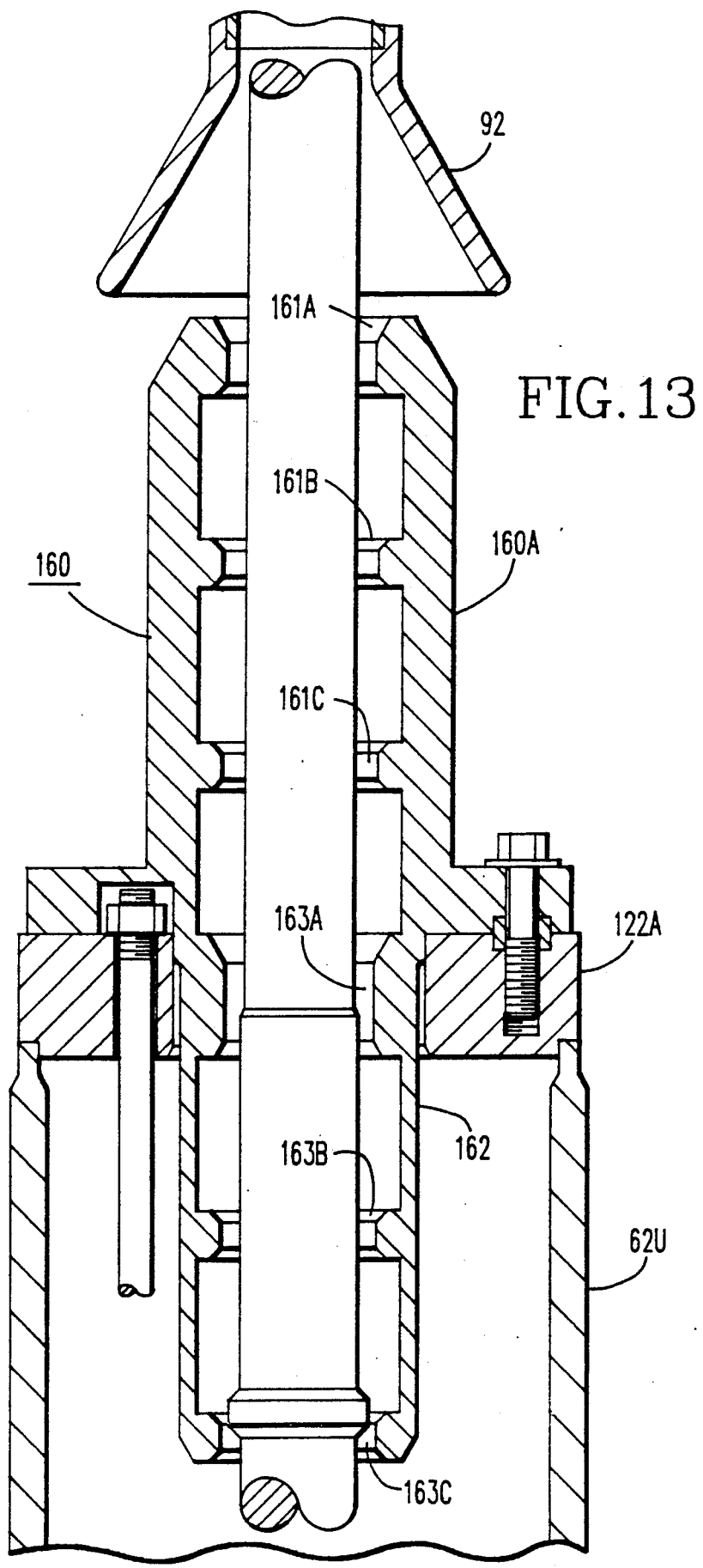

A flow restrictor 166 in FIG. 12 is similar to the flow restrictor 160 of FIG. 13, except that it is designed for standard plants like the one applicable to FIG. 8 where standard spacing is provided between the thermal sleeve and the top guide tube plate. Thus, the flow restrictor 166 has a single contraction/expansion loss above top plate 122E and is structured like the flow restrictor 160 with three cascaded contraction/expansion losses below the top plate 122E.

Figure 14:
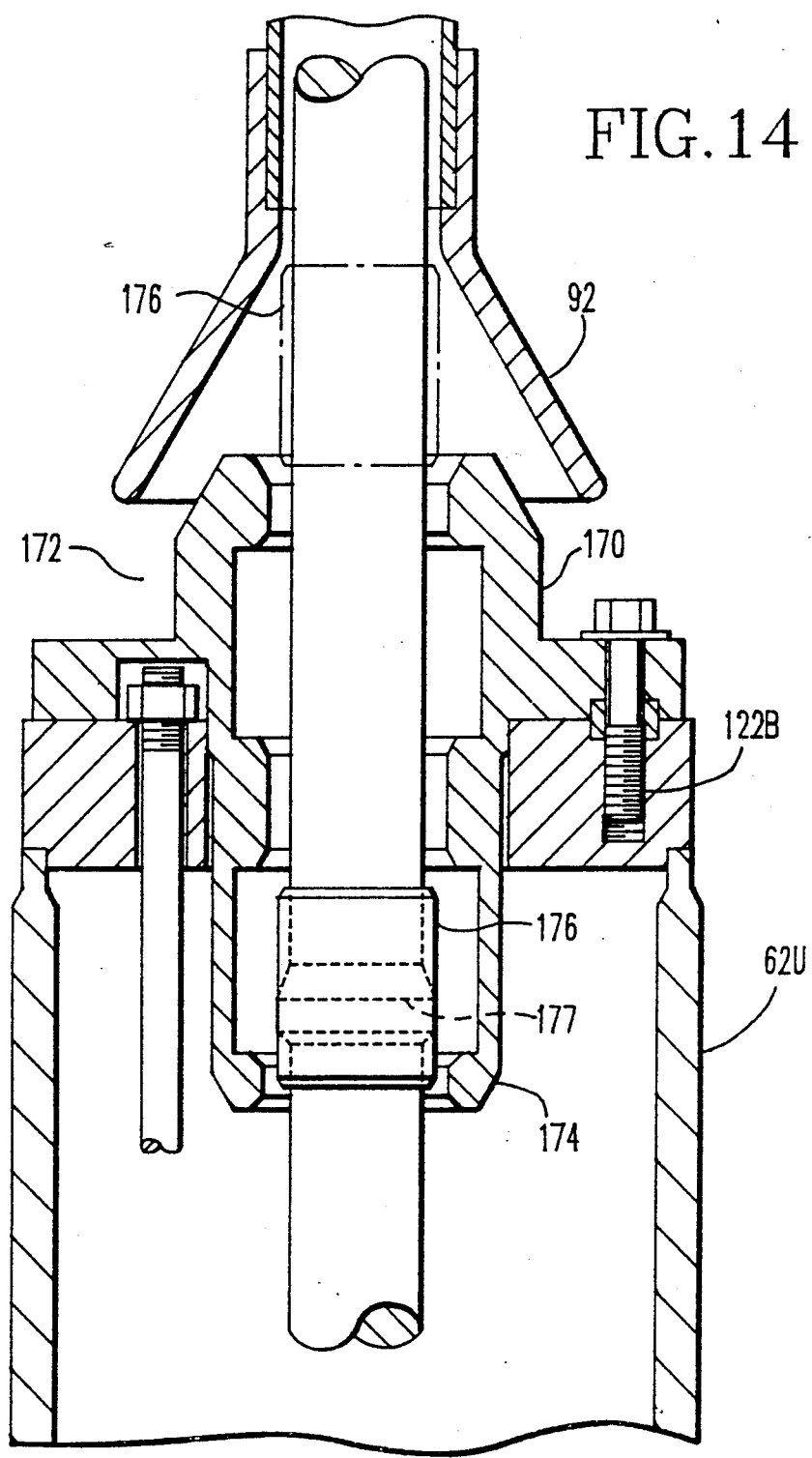

In FIG. 14, see attached FIG. 14, another modified flow restrictor 170 is shown for use in plants with rapid refueling feature which have a relatively longer core (14 feet versus 12 feet) and longer control rod assembly. To operate rapid refueling, the control rod assembly must be able to step up 7.5 inches above the normal 258 step position. This restricts the length of the B restrictor sleeve 176 to prevent interference with the thermal sleeve funnel 92. Because of reduced space 172, the flow restrictor 170 has a portion 174 that extends through an enlarged opening in the top guide tube plate 122. A short protective sleeve 176 is attached by threading to the original pickup button 177. The restrictor sleeve 176 length is designed to engage any one of the flow restrictor 170 contractions over a range of drive rod 176 positions to provide flow area reduction over such range if repositioning is employed to spread the control rod wear over several positions to reduce wear depth.

Figure 15:
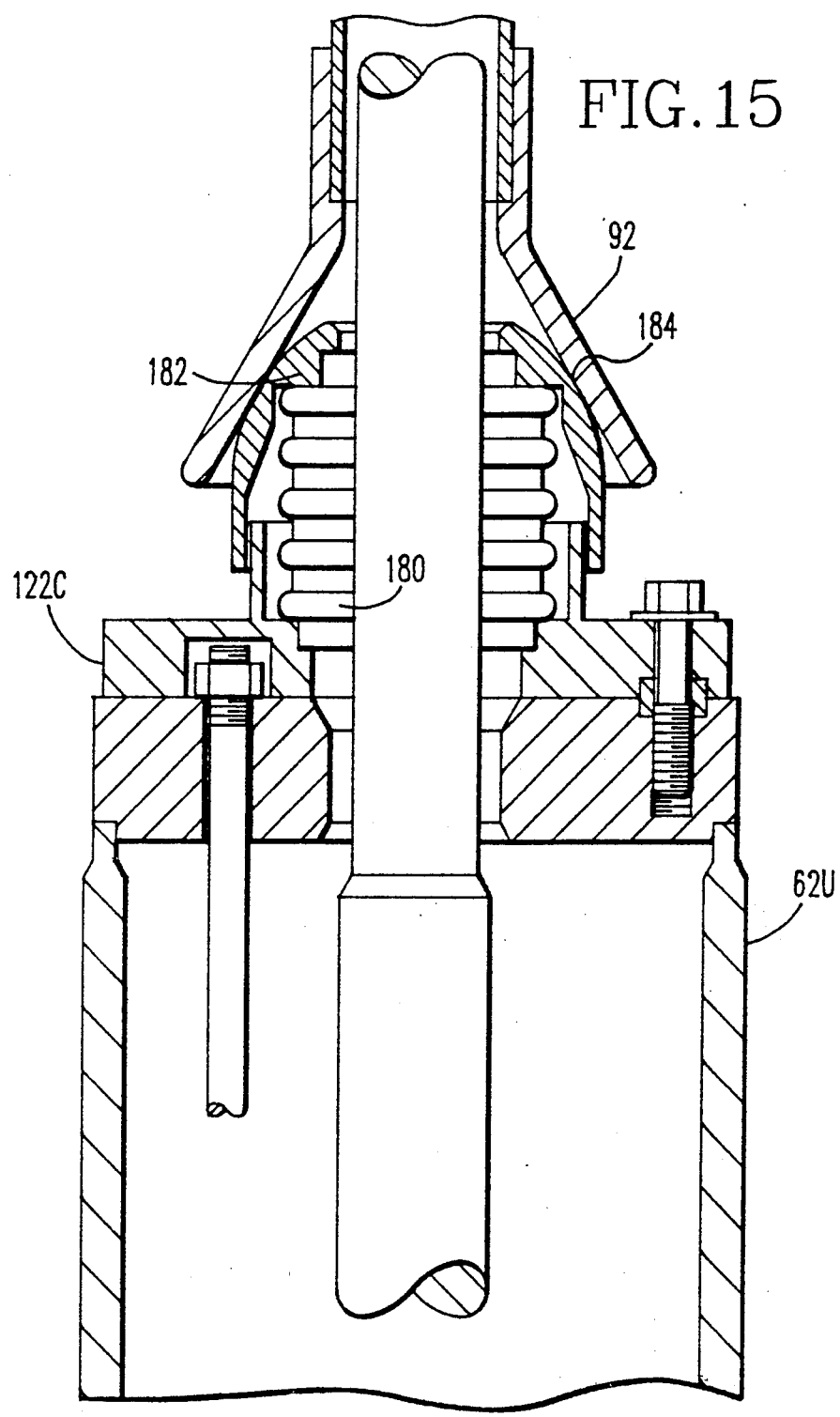

The flow restrictor can be modified to be a flow limiter, i.e. a device that blocks coolant flow through the control rod guide tube 62, and further to accommodate changes in the distance between the thermal sleeve and the upper guide tube 62 caused by thermal growths and pressure bowing of the vessel dome or the upper support plate 46. In FIG. 15, a bellow spring 180 is seated against top plate 122C to preload flow blocker 182 against the thermal sleeve 92. A spherical seat 184 maintains ring contact around the thermal sleeve 92 regardless of any cone tilt of the thermal sleeve 92.

Figure 16:
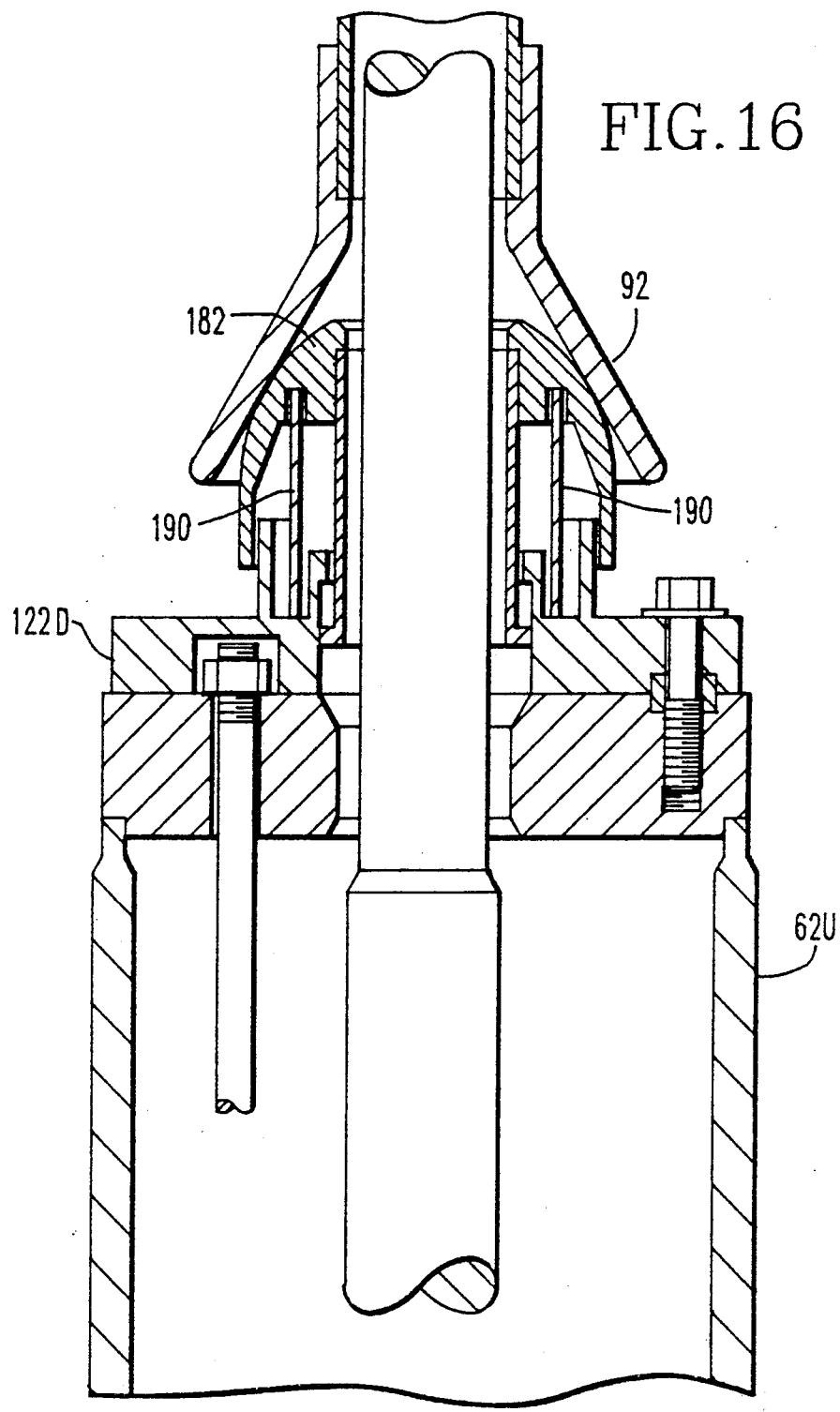

In FIG. 16, a coil spring 190 is seated against top plate 122D to preload the flow blocker 182 against the thermal sleeve 92. Generally, the coil spring 190 is more flexible than the bellow spring 180 since it provides blocker/sleeve contact control over a wider range of axial distances.

What is claimed is:

1. A system for providing control rod guidance support with restricted rod coolant flow in a nuclear reactor pressure vessel having a fuel core with an outlet plenum for core heated coolant located thereabove and with an upper head plenum located above the outlet plenum and receiving a portion of return core coolant flow, a plurality of externally driven control rod assemblies each having a drive rod coupled to a depending control rod and extending vertically through the upper plenum and outlet plenum spaces for control rod movement into and out of the core to control the nuclear reaction, said control rod guidance support system comprising:

a generally solid upper horizontal support plate secured to the vessel above the fuel core between the upper head plenum and the outlet plenum;

a control rod guide tube assembly for each control rod assembly having an upper guide tube located in the upper plenum above the upper support plate and lower guide tube means located in the outlet plenum and aligned with the upper guide tube through an opening in the upper support plate and further aligned with a fuel assembly located in the core therebelow;

said upper guide tube and said lower guide tube means housing the control rod when it is withdrawn from the fuel core and having a plurality of horizontal support cards secured therein at vertically spaced locations and provided with openings therethrough to provide guided support of the control rod when it is positioned and as it moves along its vertical path operation;

said upper guide tube having a top enclosure plate with a drive rod opening therethrough sized to provide a predetermined clearance space between said drive rod and said top enclosure plate and to direct coolant flow between said upper and outlet plenums and through said guide tube assembly;

means for restricting coolant flow through said top plate clearance space to reduce control rod wear;

coupling means for securing the drive and control rods in end-to-end relation within the guide tube assembly and located just below said top enclosure plate with the control rod fully withdrawn;

said coolant restricting means including at least a flow restrictor located above and secured to said top enclosure plate and having an upper portion disposed about and spaced from the drive rod to provide a flow gap having a flow area substantially equal to said clearance space and otherwise structured to provide at least one contraction-expansion loss above said top guide tube plate for guide tube coolant flow;

said coolant restricting means further includes a sleeve disposed about and secured to said coupling means and having a portion thereof extending upwardly over the drive rod so that said sleeve reduces the flow area in said clearance space when the control rod is fully withdrawn; and means providing a total bypass area between said upper and outlet plenums that takes up at least some of the restricted flow from the upper control rod guide tubes.

2. A control rod support system as set forth in claim 1 wherein means are provided for securing the upper end of said flow restricting sleeve to the drive rod.

3. A control rod support system as set forth in claim 1 wherein said bypass flow means includes a plurality of distributed openings through said upper support plate.

4. A control rod support system as set forth in claim 3 wherein said bypass openings are distributed in accordance with, the radial pressure profile across the outlet plenum.

5. A control rod support system as set forth in claim 3 wherein said upper support plate includes a plurality of control rod openings of which preselected ones are employed for said control rod assemblies, orifice plate means for closing other ones of said control rod openings and forming said bypass flow means, and cover plate means for closing any remaining ones of said control rod openings.

6. A control rod support system as set forth in claim 1 wherein said flow restrictor has a bottom portion forming a flange that is bolted to said top enclosure plate and further having an upwardly extending tubular portion defining an expansion chamber above said top plate and about said drive rod and having a top end portion extending about the drive rod and said sleeve and defining a contraction for top entering coolant and further defining a gap with said sleeve substantially equal to said clearance space less the sleeve thickness.

7. A control rod support system as set forth in claim 6 wherein said top enclosure plate is formed to provide a coolant contraction path for coolant entering from its top side and a coolant expansion path for coolant outletting from its bottom side.

8. A control rod support system as set forth in claim 1 wherein said top enclosure plate has a relatively enlarged opening and said flow restrictor further includes a lower portion extending downwardly from said upper portion through sad top plate opening into said upper guide tube to define a coolant flow gap with said sleeve substantially equal to said clearance space less the sleeve thickness and otherwise being structured to provide at least one additional contraction-expansion for guide tube coolant flow.

9. A control rod support system as set forth in claim 8 wherein said flow restrictor lower portion is otherwise structured to provide three cascaded contraction-expansions for guide tube coolant flow.

10. A control rod support system as set forth in claim 1 wherein said horizontal guiding support plates are provided with a plurality of vertically aligned openings for a plurality of elongated control rodlets that depend from a top spider, and said coupling means is secured to said spider.

11. A system for providing control rood guidance support with restricted rod coolant flow in a nuclear reactor pressure vessel having a fuel core with an outlet plenum for core heated coolant located thereabove and with an upper head plenum located above the outlet plenum and receiving a portion of return core coolant flow, a plurality of externally driven control rod assemblies each having a drive rod coupled to a depending control rod and extending vertically through the upper plenum and outlet plenum spaces for control rod movement into and out of the core to control the nuclear reaction, said control rod guidance support system comprising:

a generally solid upper horizontal support plate secured to the vessel above the fuel core between the upper head plenum and the outlet plenum;

a control rod guide tube assembly for each control rod assembly having an upper guide tube located in the upper plenum above the upper support plate and lower guide tube means located in the outlet plenum and aligned with the upper guide tube through an opening in the upper support plate and further aligned with a fuel assembly located in the core therebelow;

said upper guide tube and said lower guide tube means housing the control rod when it is withdrawn from the fuel core and having a plurality of horizontal support cards secured therein at vertically spaced locations and provided with openings therethrough to provide guided support of the control rod when it is positioned and as it moves along its vertical path operation;

said upper guide tube having a top enclosure plate with a drive rod opening therethrough sized to provide a predetermined clearance space between said drive rod and said top enclosure plate and to direct coolant flow between said upper and outlet plenums and through said guide tube assembly;

means for restricting coolant flow through said top plate clearance space to reduce control rod wear;

coupling means for securing the drive and control rods in end-to-end relation within the guide tube assembly and located just below said top enclosure plate with the control rod fully withdrawn;

said coolant restricting means including at least a flow restrictor located above and secured to said top enclosure plate and having an upper portion disposed about and spaced from the drive rod to provide a flow gap having a flow area substantially equal to said clearance space and otherwise structured to provide at least one contraction-expansion loss above said top guide tube plate for guide tube coolant flow;

wherein said clearance space is defined by the distance from an inner side of said flow restrictor and the normal outer diameter of said drive rod; and said drive rod having a lower portion with a relatively enlarged diameter to reduce the flow area within said flow restrictor when the control rod is fully withdrawn; and means providing a total bypass flow area between said upper and outlet plenums that takes up at least some of the restricted flow from the upper control rod guide tubes.

12. A system for providing control rod guidance support with restricted rod coolant flow in a nuclear reactor pressure vessel having a fuel core with ann outlet plenum for core heated coolant located thereabove and with an upper head plenum located above the outlet plenum and receiving a portion of return core coolant flow, a plurality of externally driven control rod assemblies each having a drive rod coupled to a depending control rod and extending vertically through the upper plenum and outlet plenum spaces for control rod movement into and out of the core to control the nuclear reaction, said control rod guidance support system comprising:

a generally solid supper horizontal support plate secured to the vessel above the fuel core between the upper head plenum and the outlet plenum;

a control rod guide tube assembly for each control rod assembly having an upper guide tube located in the upper plenum above the upper support plate and lower guide tube means located in the outlet plenum and aligned with the upper guide tube through an opening in the upper support plate and further aligned with a fuel assembly located in the core therebelow;

said upper guide tube and said lower guide tube means housing the control rod when it is withdrawn from the fuel core and having a plurality of horizontal support cards secured therein at vertically spaced locations and provided with openings therethrough to provide guided support of the control rod when it is positioned and as it moves along its vertical path operation;

said upper guide tube having a top enclosure plate with a drive rod opening therethrough sized to provide a predetermined clearance space between said drive rod and said top enclosure plate and to direct coolant flow between said upper and outlet plenums and through said guide tube assembly;

means for restricting coolant flow through said top plate clearance space to reduce control rod wear;

coupling means for securing the drive and control rods in end-to-end relation within the guide tube assembly and located just below said top enclosure plate with the control rod fully withdrawn;

said coolant restricting means including at least a flow restrictor located above and secured to said top enclosure plate and having an upper portion disposed about and spaced from the drive rod to provide a flow gap having a flow area substantially equal to said clearance space and otherwise structured to provide at least one contraction-expansion loss above said top guide tube plate for guide tube coolant flow;

wherein said top enclosure plate has a relatively enlarged opening and said flow restrictor further includes a lower portion extending downwardly from said upper portion through said top plate opening into said upper guide tube to define a coolant flow gap with the drive rod substantially equal to said clearance space and otherwise being structured to provide at least three cascaded contraction-expansion for guide tube coolant flow, and said upper flow restrictor structure is otherwise structured too provide at least three cascaded contraction-expansion for guide tube coolant flow; and means providing a total bypass flow area between said upper and outlet plenums that takes up at least some of the restricted flow from the upper control rod guide tubes.

13. A system for providing control rod guidance support with restricted rood coolant flow in a nuclear reactor pressure vessel having a fuel core with an outlet plenum for core heated coolant located thereabove and with an upper head plenum located above the outlet plenum and receiving a portion of return core coolant flow, a plurality of externally driven control rod assemblies each having a drive rood coupled to a depending control rod and extending vertically through the upper plenum and outlet plenum spaces for control rod movement into and out of the core to control the nuclear reaction, said control rod guidance support system comprising:

a generally solid upper horizontal support plate secured to the vessel above the fuel core between the upper head plenum and the outlet plenum;

a control rod guide tube assembly for each control rod assembly having an upper guide tube located in the upper plenum above the upper support plate and lower guide tube means located in the outlet plenum and aligned with the upper guide tube through an opening in the upper support plate and further aligned with a fuel assembly located in the core therebelow;

said upper guide tube and said lower guide tube means housing the control rod when it is withdrawn from the fuel core and having a plurality of horizontal support cards secured therein at vertically spaced locations and provided with openings therethrough to provide guided support of the control rod when it is positioned and as it moves along its vertical path operation;

said upper guide tube having a top enclosure plate with a drive rod opening therethrough sized to provide a predetermined clearance space between said drive rod and said top enclosure plate and to direct coolant flow between said upper and outlet plenums and through said guide tube assembly;

means for restricting coolant flow through said top plate clearance space to reduce control rod wear;

coupling means for securing the drive and control rods in end-to-end relation within the guide tube assembly and located just below said top enclosure plate with the control rood fully withdrawn;

said coolant restricting means including at least a flow restrictor located above and secured to said top enclosure plate and having an upper portion disposed about and spaced from the drive rod to provide a flow gap having a flow area substantially equal to said clearance space and otherwise structured to provide at least one contraction-expansion loss above said top guide tube plate for guide tube coolant flow;

wherein said top enclosure plate has a relatively enlarged opening and said flow restrictor further includes a lower portion extending downwardly from said upper portion through said top plate opening into said upper guide tube to define a coolant flow gap with the drive rod substantially equal to said clearance space and otherwise being structured to provide two contraction-expansions of guide tube coolant flow; and means providing a total bypass flow area between said upper and outlet plenums that takes up at least some of the restricted flow from the upper control rod guide tubes.

14. In a nuclear reactor pressure vessel having a fuel core with an outlet plenum for core heated coolant located thereabove and with an upper head plenum located above the outlet plenum and receiving a portion of return core coolant flow, a plurality of externally driven control rod assemblies each having a drive rod coupled to a depending control rod and extending vertically through the upper plenum and outlet plenum spaces for control rod movement into and out of the core to control the nuclear reaction, a system of providing control rod guidance support with restricted rod coolant flow comprising:

a generally solid upper horizontal support plate secured to the vessel above the fuel core between the upper head plenum and the outlet plenum;

a control rood guide tube assembly for each control rod assembly having an upper guide tube located inn the upper plenum above the upper support plate and lower guide tube means located in the outlet plenum and aligned with the upper guide tube through ann opening in the upper support plate and further aligned with a fuel assembly located in the core therebelow;

said upper guide tube and said lower guide tube means housing the control rod when it is withdrawn from the fuel core and having a plurality of horizontal support cards secured therein at vertically spaced locations and provided with openings therethrough to provide guided support to the control rod when it is positioned and as it moves along its vertical path operation;

said upper guide tube having a top enclosure plate with a drive rod opening therethrough sized to provide a predetermined clearance space between said drive rod and said top enclosure plate and to direct coolant flow between said upper and outlet plenums and through said guide tube assembly;

coupling means for securing the drive and control rods in end-to-end relation within the guide tube assembly and located just below said top enclosure plate with the control rod fully withdrawn;

means for restricting coolant flow through said top plate clearance space too reduce control rod wear, located above and secured to said top enclosure plate and having an upper portion disposed about and spaced from the drive rod to provide a flow gap having a flow area substantially equal to said clearance space and otherwise structured to provide at least one contraction-expansion loss above said top guide tube plate for guide tube coolant flow; and said coolant restricting means further including a sleeve disposed about and secured to said coupling means and having a portion thereof extending upwardly over the drive rod so that said sleeve reduces the flow area in said clearance space when the control rod is fully withdrawn.

15. The nuclear reactor as set forth in claim 14 wherein means are provided for securing the upper end of said flow restricting sleeve to the drive rod.

16. The nuclear reactor as set forth in claim 14 wherein said clearance space is defined by the distance from an inner side of said flow restrictor and the normal outer diameter of said drive rod; and said drive rod having a lower portion with a relatively enlarged diameter too reduce the flow area within said flow restrictor when the control rod is fully withdrawn.

17. The nuclear reactor as set forth in claim 14 wherein said flow restrictor has a bottom portion forming a flange that is bolted to said top enclosure plate and further having an upwardly extending tubular portion defining an expansion chamber above said top plate and about said drive rod and having a top end portion extending about the drive rod and said sleeve and defining a contraction for top entering coolant and further defining a gap with said sleeve substantially equal to said clearance space less the sleeve thickness.

18. The nuclear reactor as set forth in claim 17 wherein said top enclosure plate is formed too provide a coolant contraction path for coolant entering from its top side and a coolant expansion path for coolant outletting from its bottom side.

19. The nuclear reactor as set forth in claim 14 wherein said top enclosure plate has a relatively enlarged opening and said flow restrictor further includes a lower portion extending downardly from said upper portion through said top plate opening into said upper guide tube to define a coolant flow gap with said sleeve substantially equal to said clearance space less the sleeve thickness and otherwise being structured to provide at least one additional contraction-expansion for guide tube coolant flow.

20. The nuclear reactor as set forth in claim 19 wherein said flow restrictor lower portion is otherwise structured to provide three cascaded contraction-expansions for guide tube coolant flow.

* * * * *